(12) United States Patent
Lee et al.

(10) Patent No.: US 12,668,664 B2
(45) Date of Patent: Jun. 30, 2026

(54) SULFUR COPOLYMER AND METHOD FOR PREPARING THE SAME

(71) Applicant: KOREA INSTITUTE OF SCIENCE AND TECHNOLOGY, Seoul (KR)

(72) Inventors: Miyeon Lee, Wanju-gun (KR); Jaesang Yu, Wanju-gun (KR); Nam Ho You, Wanju-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 601 days.

(21) Appl. No.: 18/179,968

(22) Filed: Mar. 7, 2023

(65) Prior Publication Data

US 2024/0166819 A1 May 23, 2024

(30) Foreign Application Priority Data

Nov. 8, 2022 (KR) ........................ 10-2022-0147960

(51) Int. Cl.
C08G 75/14 (2006.01)
G02B 1/04 (2006.01)

(52) U.S. Cl.
CPC ............. C08G 75/14 (2013.01); G02B 1/041 (2013.01)

(58) Field of Classification Search
CPC .......... C08G 75/14; G02B 1/041; G02B 1/04; C08L 81/00
See application file for complete search history.

(56) References Cited

U.S. PATENT DOCUMENTS

| | | | |
|---|---|---|---|
| 9,306,218 B2 | 4/2016 | Pyun | |
| 9,567,439 B1 | 2/2017 | Pyun | |
| 11,078,333 B2 | 8/2021 | Pyun | |
| 2022/0305524 A1 | 9/2022 | Im | |

FOREIGN PATENT DOCUMENTS

| | | |
|---|---|---|
| JP | 2002-348349 A | 12/2002 |
| KR | 10-2016-0122838 A | 10/2016 |
| KR | 10-2103799 B1 | 4/2020 |
| KR | 10-2021-0106872 A | 8/2021 |
| WO | 2012/147708 A1 | 11/2012 |
| WO | 2015/123552 A1 | 8/2015 |

OTHER PUBLICATIONS

Griebel et al., Progress in Polymer Science 58 (2016) 90-125 2016.*

(Continued)

*Primary Examiner* — Shane Fang

(57) ABSTRACT

Provided herein are a sulfur copolymer derived from an elemental sulfur and a thiol monomer and a method for preparing the same. The sulfur copolymer is synthesized by a simple method, and can be widely used in cameras and lenses, or defense materials-related industries, by replacing expensive inorganic materials used in existing infrared lenses. In addition, by adjusting the content of one or more sulfur monomers or two or more sulfur monomers, not only mid-wave infrared transmission but also long-wave infrared transmittance can be maintained at a high level.

14 Claims, 19 Drawing Sheets

Elemental sulfur            Polymeric sulfur                    Poly(S-r-BTT)

(56) References Cited

OTHER PUBLICATIONS

Mok Lee et al., "Synthesis of Poly(phenylene polysulfide) Networks from Elemental Sulfur and p-Diiodobenzene for Stretchable, Healable, and Reprocessable Infrared Optical Applications," ACS Macro Letters, 2019, vol. 8, pp. 912-916.

Tristan S. Kleine et al., "Infrared Fingerprint Engineering: A Molecular-Design Approach to Long-Wave Infrared Transparency with Polymeric Materials," Angewandte Chemie International Edition, 2019, vol. 58, pp. 17656-17660.

Douglas J. Parker et al.,"Sustainable inverse-vulcanised sulfur polymers," RSC Advances, 2018, pp. 27892-27899, vol. 8.

Written Decision on Registration for Korean Patent Application No. 10-2022-0147960, dated Jul. 23, 2025.

* cited by examiner

FIG. 1

Hot pressing $\longrightarrow$

185 °C, 20 MPa, 30 min

S80-BTT20          S70-BTT30          S60-BTT40          S50-BTT50

SULFUR COPOLYMER AND METHOD FOR PREPARING THE SAME

CROSS REFERENCE TO RELATED APPLICATION

The present application claims priority to Korean Patent Application No. 10-2022-0147960, filed Nov. 8, 2022, the entire contents of which is incorporated herein for all purposes by this reference.

BACKGROUND OF THE INVENTION

Field of the Invention

Disclosed herein is a sulfur copolymer with high thermal stability and high infrared transmittance and a method for preparing the same.

DESCRIPTION OF GOVERNMENT-SPONSORED RESEARCH

This research was conducted with the support of the Ministry of Trade, Industry and Energy of the Republic of Korea under the supervision of the Korea Evaluation Institute of Industrial Technology. The research project name is the development of self-sufficient technology for strategic core materials, and the research task title is the development of polymer material using sulfur with high refractive index and high transmittance for optical use with infrared transmittance of over 95% for the sensor market and application technology (Task identification number: 1415180382).

DESCRIPTION OF THE RELATED ART

Recently, as the demand for optical components such as sensors, cameras, lenses, and windows has rapidly increased, polymers and the like have emerged as substitute raw materials for expensive inorganic materials mainly used in infrared lenses. However, general polymer materials have very low infrared transmittance and are not easily used for infrared lenses.

Meanwhile, an elemental sulfur ($S_8$) represented by chemical formula $S_8$ is an unwanted by-product of petroleum refining and gas reserves, and more than 70 million tons are produced annually, and can be easily used at low cost. This sulfur is widely used in the production of general chemicals, such as sulfuric acid, fertilizers, and the vulcanization of natural and synthetic rubber. Accordingly, optical materials with sulfur-containing polymers using sulfur have been reported, but it is difficult to find materials with high mid-wave infrared and long-wave infrared transmittances.

Therefore, there is a need for technology development capable of providing an optical material having high transmittance and price stability by utilizing sulfur, which is inexpensive to supply.

SUMMARY OF THE INVENTION

In one aspect, exemplary embodiments of the disclosure is to provide a sulfur copolymer derived from an elemental sulfur and a thiol monomer, having excellent infrared transmittance and high heat resistance, and a method for preparing the same.

An embodiment of the disclosure provides a sulfur copolymer including a repeating unit having benzene and one or more sulfur monomers.

In one embodiment, the repeating unit may be represented by Chemical Formula 1 below.

[Chemical Formula 1]

In Chemical Formula 1, n is an integer from 0 to 100, m is an integer from 1 to 6.

In one embodiment, the sulfur copolymer may have the repeating unit represented by Chemical Formula 2.

[Chemical Formula 2]

In Chemical Formula 2, n1 to n3 are integers from 0 to 100, and are the same as or different from each other.

In one embodiment, the sulfur copolymer may be derived from an elemental sulfur and a trithiol monomer.

In one embodiment, the sulfur copolymer may be derived from an elemental sulfur and a thiol monomer, and the thiol monomer may be a dithiol monomer, a trithiol monomer, or a hexadiol monomer.

In one embodiment, the sulfur copolymer may be derived from an elemental sulfur and a thiol monomer, and a content of the elemental sulfur may be 50 to 80% by weight based on a total weight of the elemental sulfur and the thiol monomer.

In one embodiment, the sulfur copolymer may be derived from an elemental sulfur and a thiol monomer, and a content of the thiol monomer may be 20 to 50% by weight based on a total weight of the elemental sulfur and the thiol monomer.

In one embodiment, the sulfur copolymer may be derived from an elemental sulfur and a thiol monomer, and a weight ratio of the elemental sulfur and the thiol monomer may be 1:1 to 4:1.

In one embodiment, the sulfur copolymer may be for an infrared lens. In one embodiment, the sulfur copolymer may be for transmitting a mid-wave infrared ray or a long-wave infrared ray.

In one embodiment, the sulfur copolymer may have a maximum transmittance of 70% when applied to an infrared lens having a thickness of 1 mm or more.

In one embodiment, the sulfur copolymer may have a mid-wave infrared transmittance of 50% or more when applied to an infrared lens having a thickness of 1 mm or more.

In one embodiment, the sulfur copolymer may have a long-wave infrared transmittance of 30% or more when applied to an infrared lens having a thickness of 1 mm or more.

Another embodiment of the disclosure provides an infrared lens including the sulfur copolymer described above.

Another embodiment of the disclosure provides a method for preparing a sulfur copolymer, including the steps of providing an elemental sulfur; heating the elemental sulfur to prepare a polymeric sulfur; and polymerizing the polymeric sulfur and a benzene monomer having one or more thiol groups to synthesize a sulfur copolymer.

In one embodiment, in the step of synthesizing the sulfur copolymer, a reverse vulcanization reaction may be performed.

In one embodiment, the benzene monomer having the one or more thiol groups may be represented by the following Chemical Formula 3.

[Chemical Formula 3]

In one embodiment, the sulfur copolymer may include a repeating unit represented by Chemical Formula 1:

[Chemical Formula 1]

In Chemical Formula 1, n may be an integer from 0 to 100, m may be an integer from 1 to 6.

In one embodiment, the sulfur copolymer may include a repeating unit represented by Chemical Formula 2:

[Chemical Formula 2]

In Chemical Formula 2, n1 to n3 may be integers from 0 to 100, and may be the same as or different from each other.

In one embodiment, the step of heating the elemental sulfur to prepare the polymeric sulfur may be performed at a temperature of 170 to 190° C.

The sulfur copolymer according to an embodiment of the disclosure can replace expensive inorganic materials used in conventional infrared lenses at a relatively low cost. In addition, the sulfur copolymer has high thermal stability, high glass transition temperature, high refractive index, and high infrared transmittance, and can be applied to the transmission of long-wave infrared rays as well as the transmission of mid-wave infrared rays depending on the sulfur content. In addition, according to the method for preparing a sulfur copolymer according to an embodiment of the disclosure, a sulfur copolymer can be synthesized in a simple way using an inverse vulcanization reaction.

BRIEF DESCRIPTION OF THE DRAWINGS

FIG. 1 shows a schematic diagram of a preparing process of a sulfur copolymer according to an embodiment of the disclosure.

4

Figure 2:
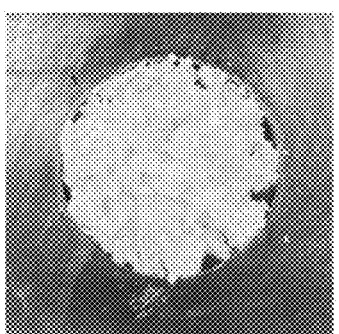
Figure 2:

FIG. 2 shows a schematic diagram of a lens processing process prepared using a sulfur copolymer according to an embodiment of the disclosure.

Figure 3:
Figure 3:
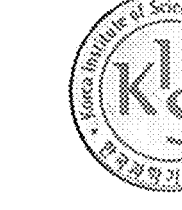
Figure 3:
Figure 3:
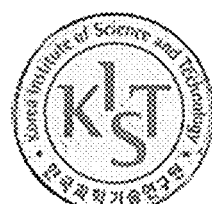
Figure 3:
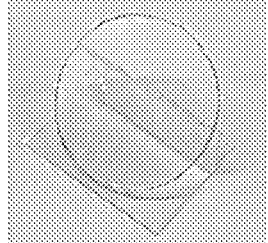
Figure 3:
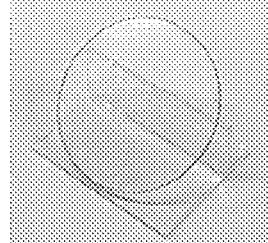
Figure 3:
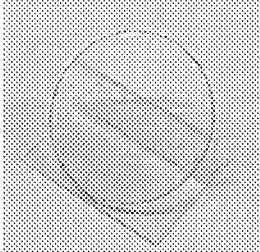
Figure 3:
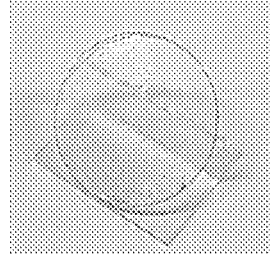

FIG. 3 shows the transparency of a lens prepared using a sulfur copolymer according to an embodiment of the disclosure.

Figure 4:
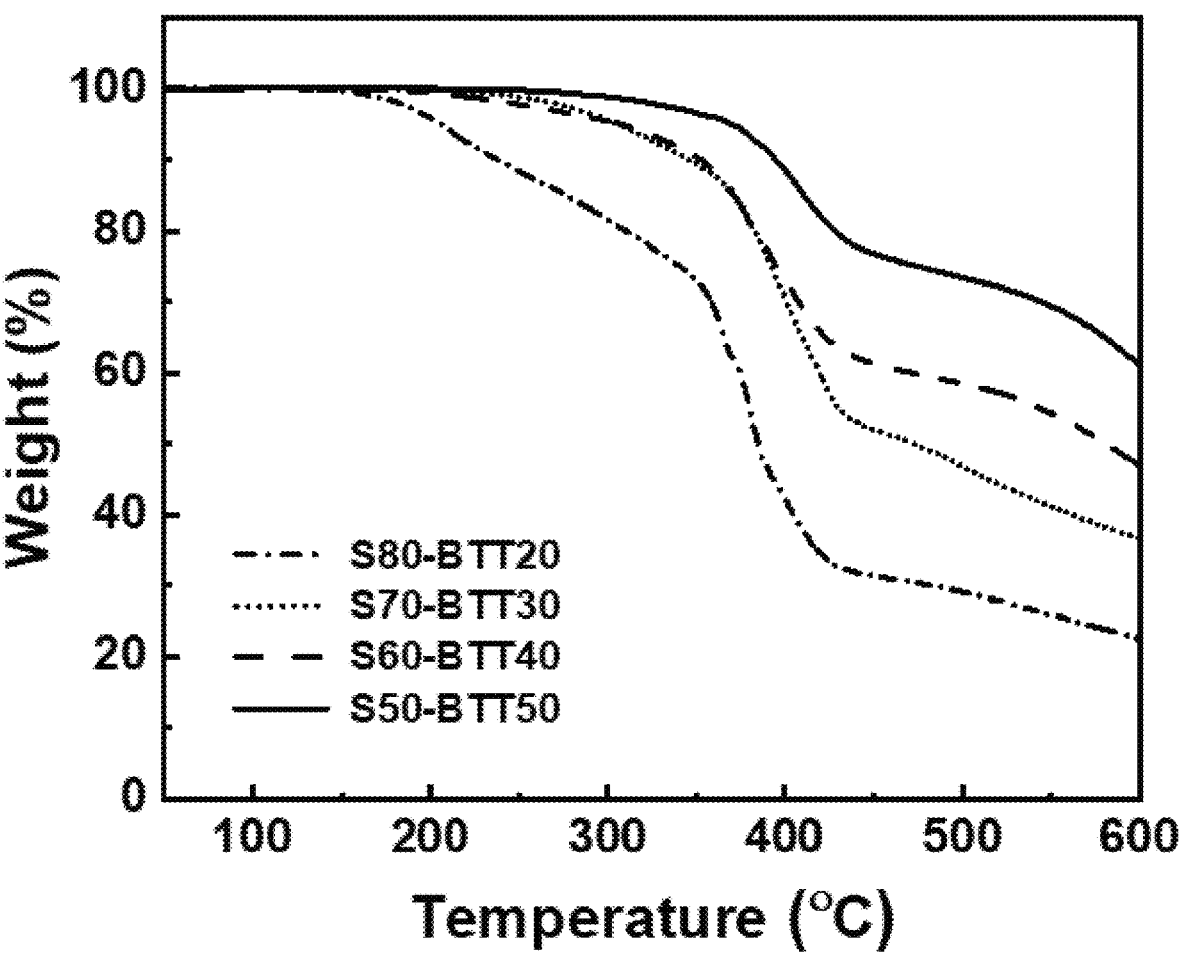

FIG. 4 shows the weight loss and thermal stability of a sulfur copolymer according to an embodiment of the disclosure.

Figure 5A:
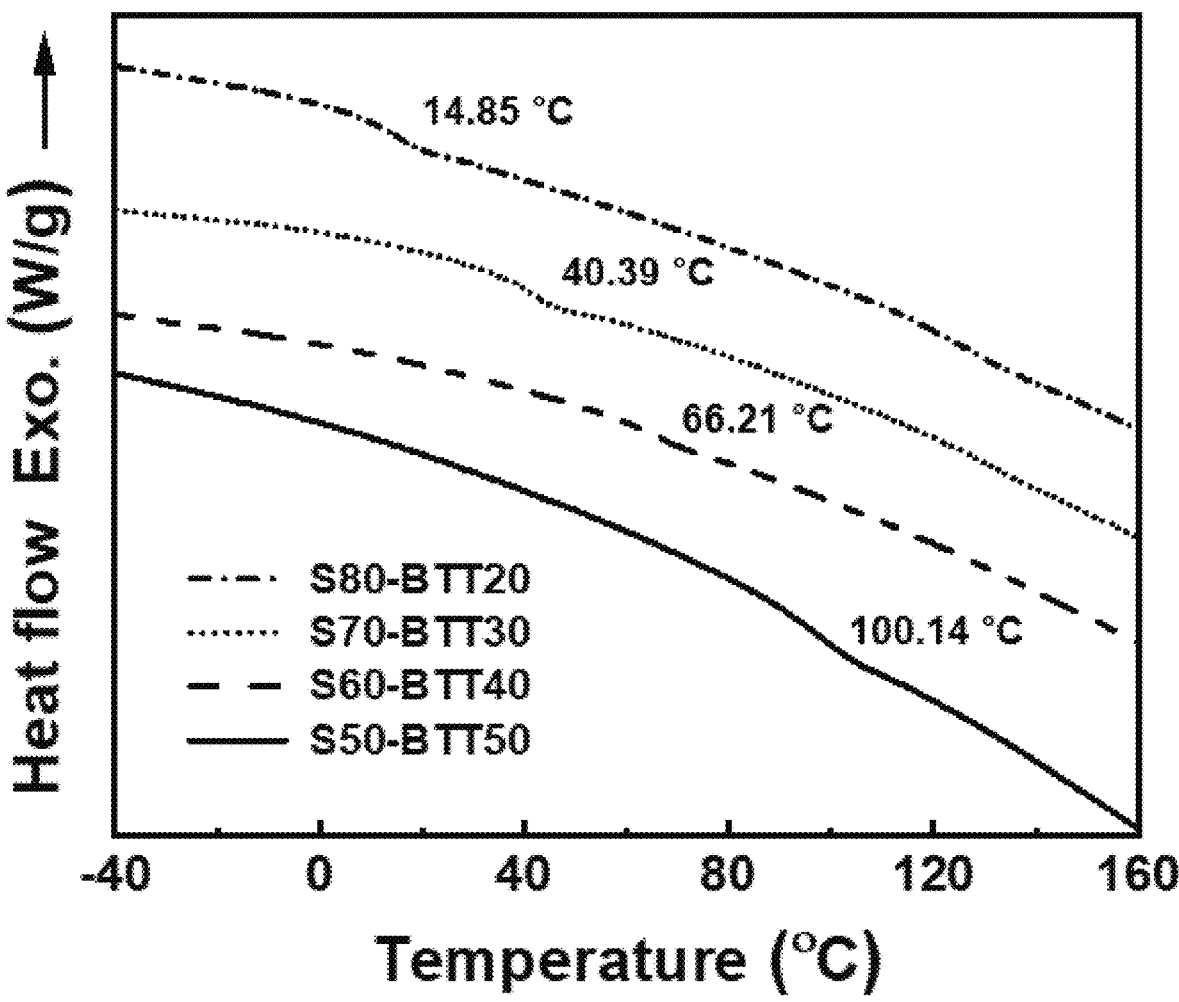
Figure 5B:
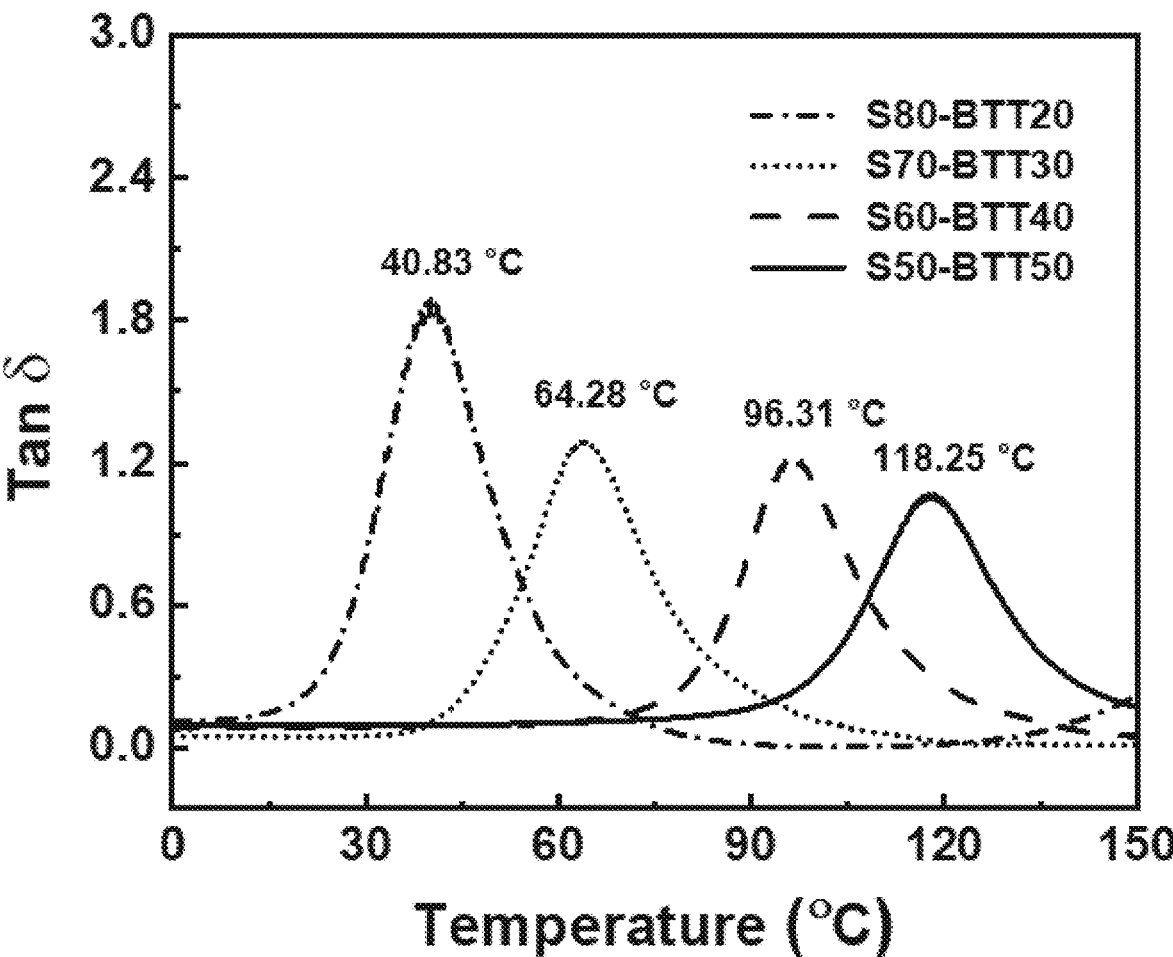

FIGS. 5A and 5B show the glass transition temperature of a sulfur copolymer according to an embodiment of the disclosure.

Figure 6:
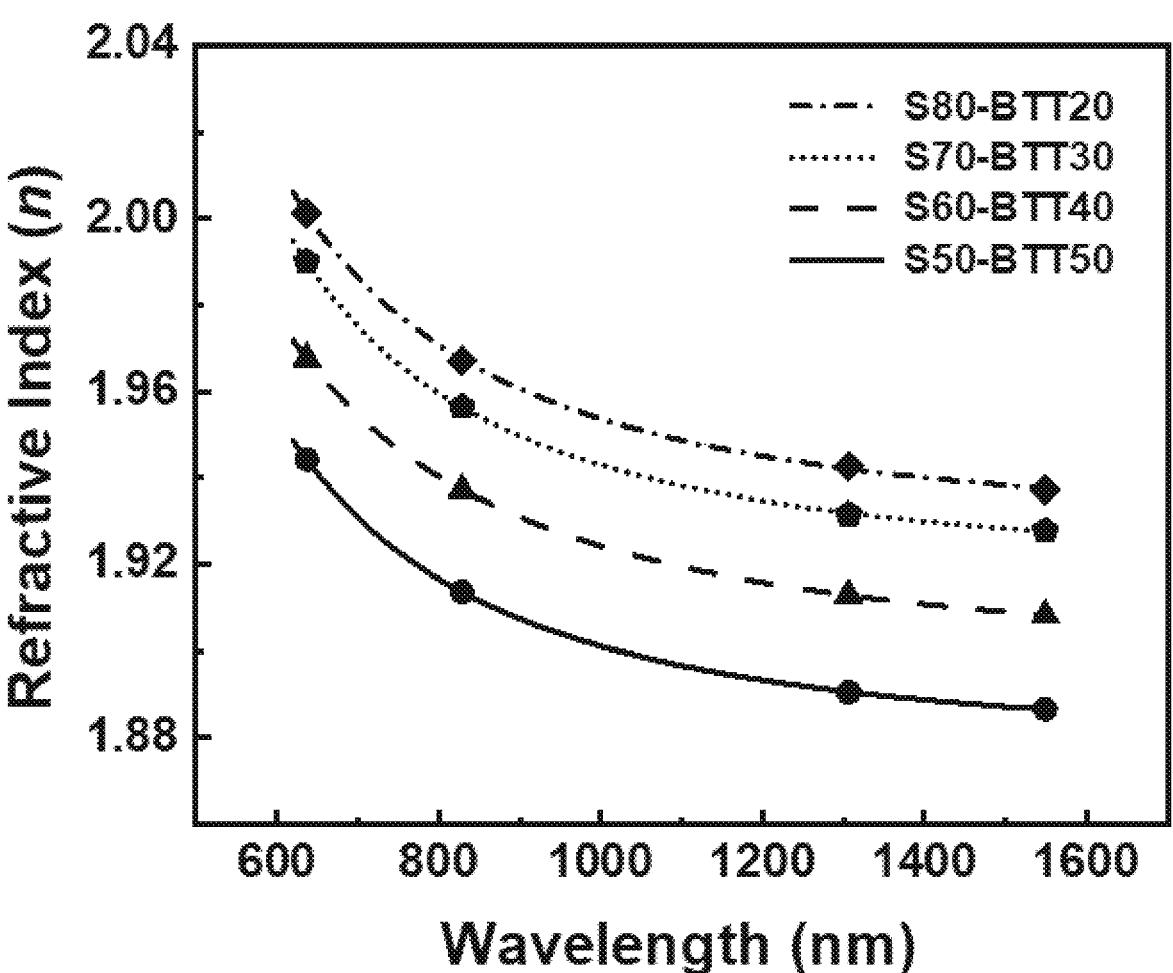

FIG. 6 shows the refractive index of a sulfur copolymer according to an embodiment of the disclosure.

Figure 7:
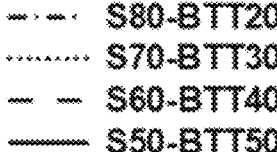
Figure 7:
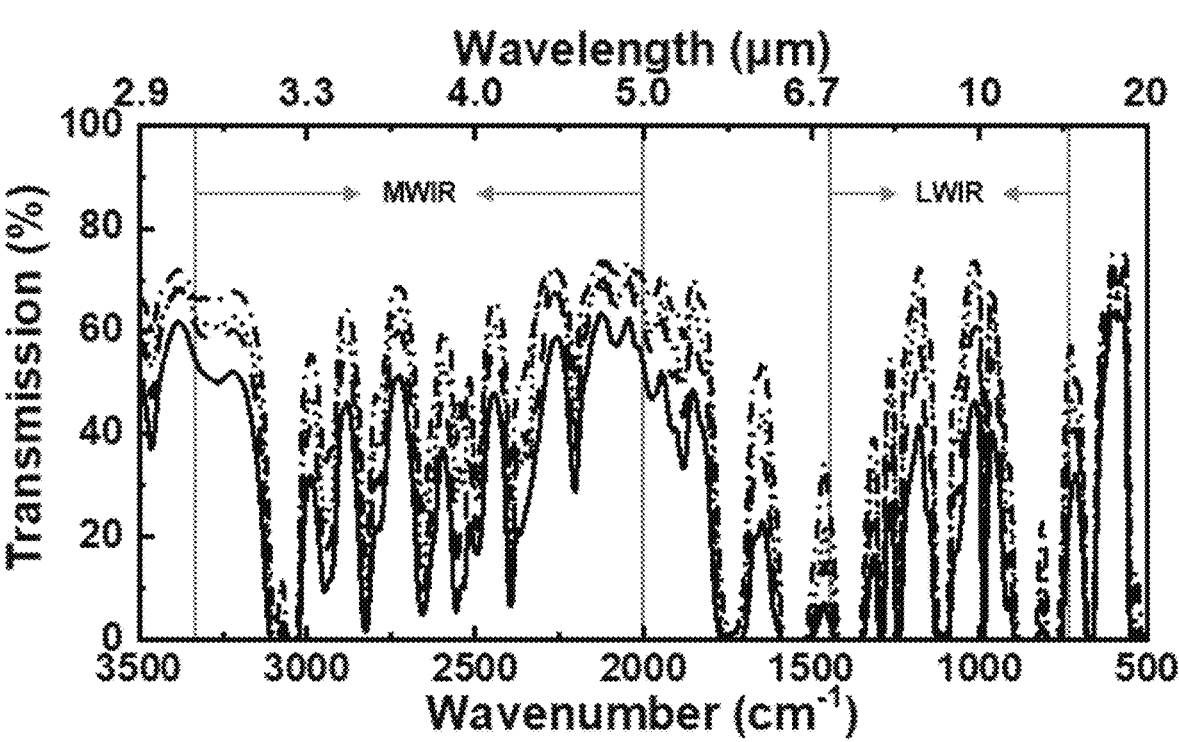
Figure 8A:
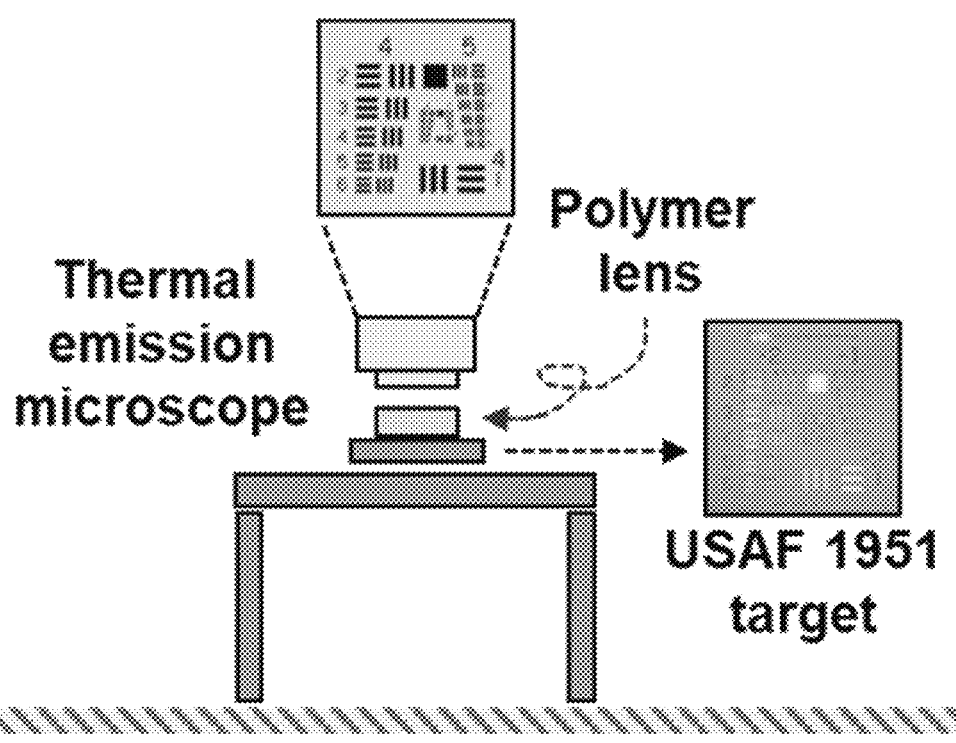
Figure 8B:
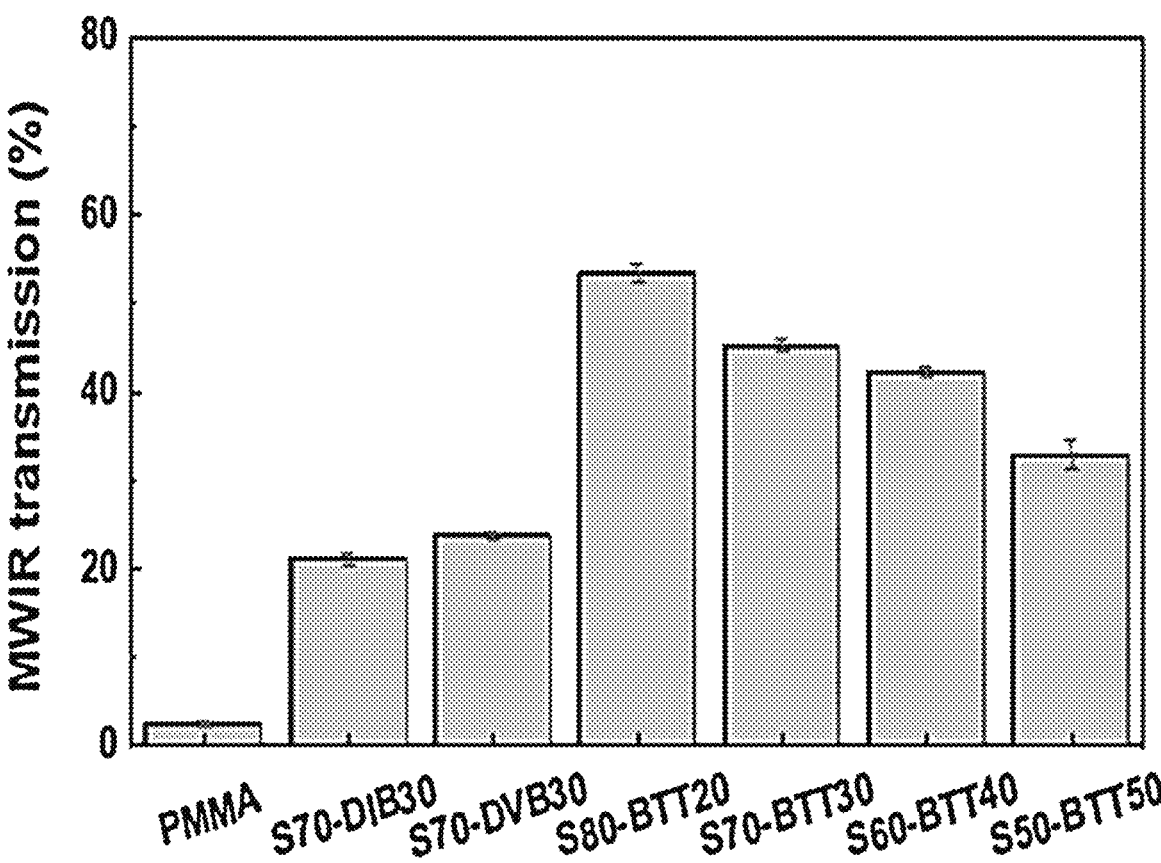
Figure 8C:
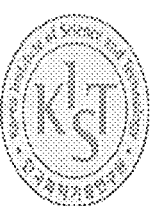
Figure 8C:
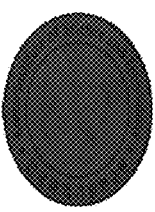
Figure 8C:
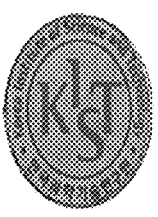
Figure 8C:
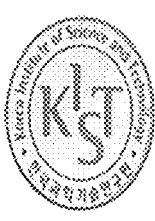
Figure 8C:
Figure 8C:
Figure 8C:
Figure 8D:
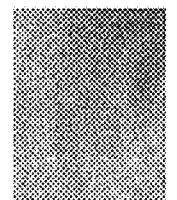
Figure 8D:
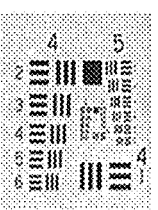
Figure 8D:
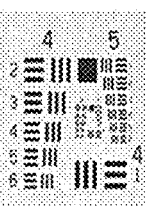
Figure 8D:
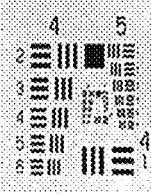
Figure 8D:
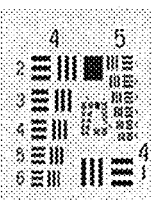
Figure 8D:
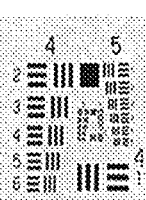
Figure 8D:
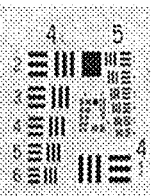
Figure 9A:
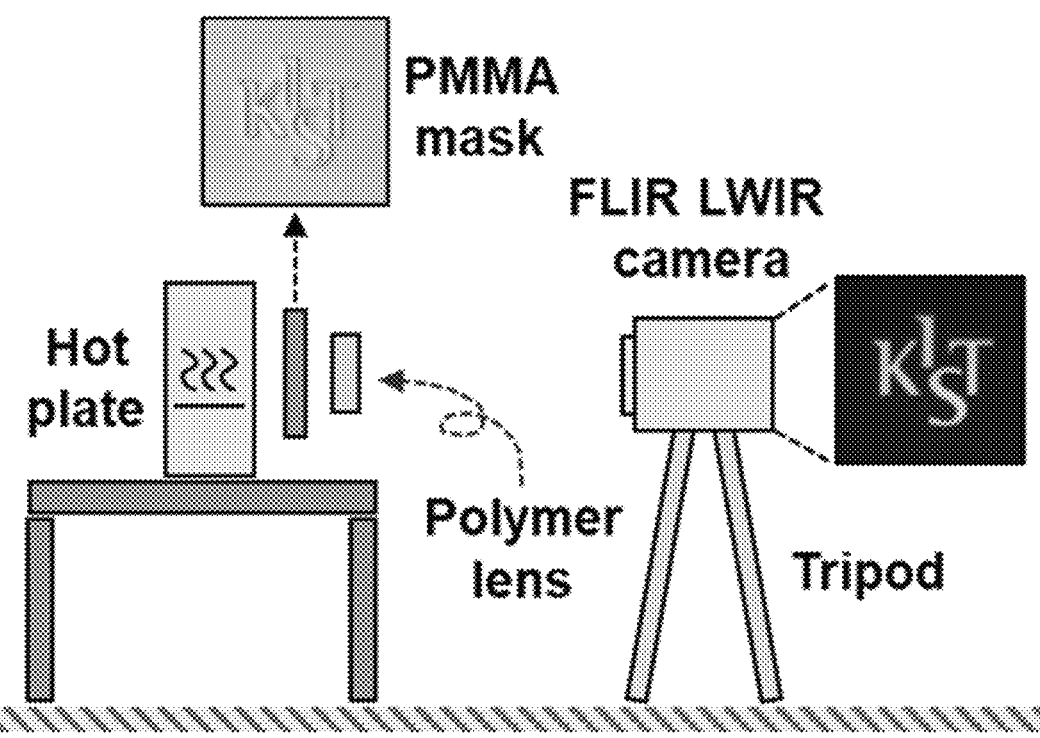
Figure 9B:
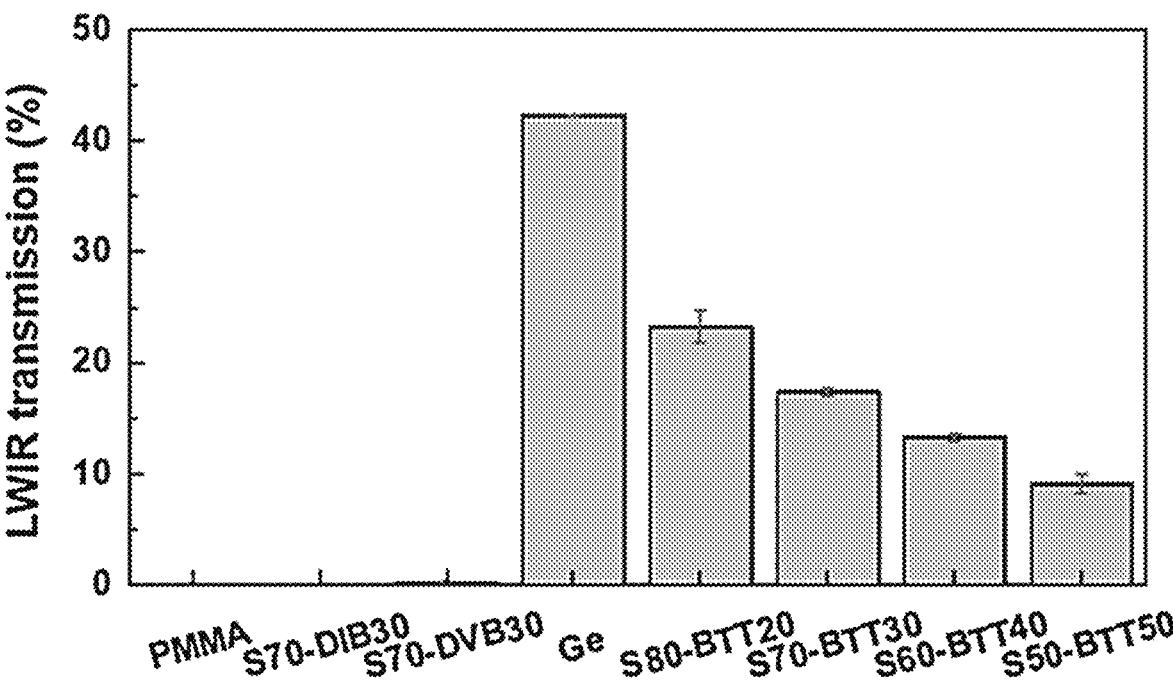
Figure 9C:
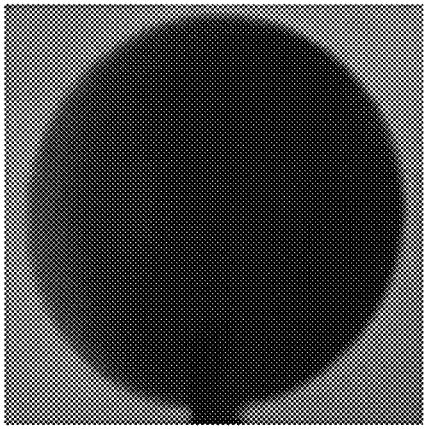
Figure 9D:
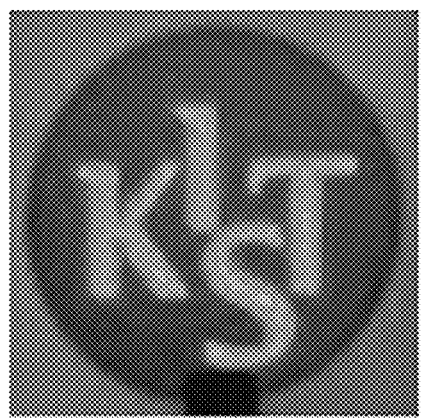
Figure 9E:
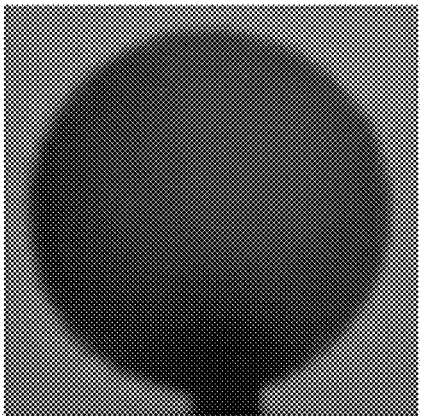
Figure 9F:
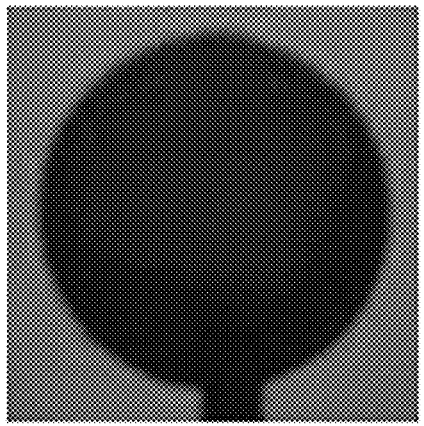
Figure 9G:
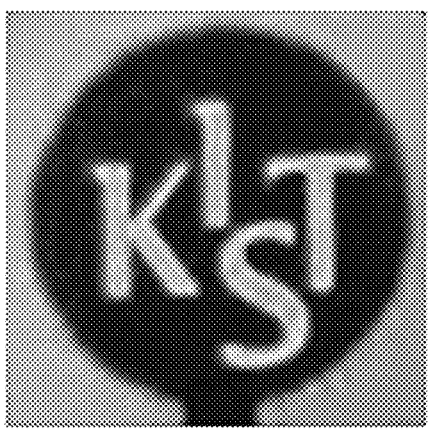
Figure 9H:
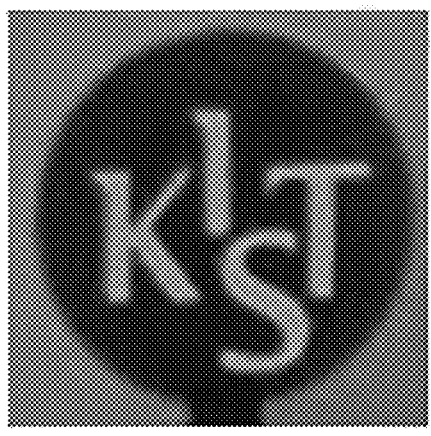
Figure 9I:
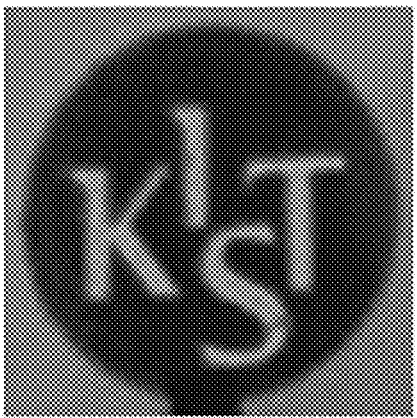
Figure 9J:
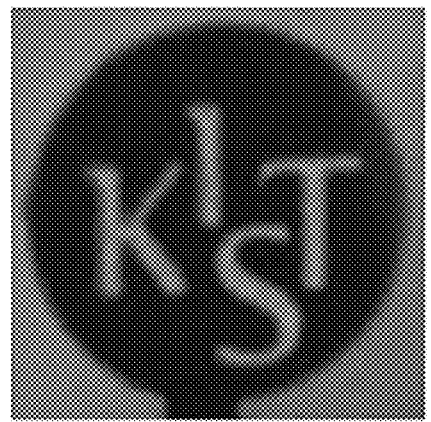

FIG. 7 shows the infrared transmittance of a sulfur copolymer according to an embodiment of the disclosure.

FIGS. 8A, 8B, 8C, and 8D show the mid-wave infrared imaging of a sulfur copolymer according to embodiments of the disclosure.

FIGS. 9A, 9B, 9C, 9D, 9E, 9F, 9G, 9H, 9I, and 9J show the long-wave infrared imaging of a sulfur copolymer according to an embodiment of the disclosure.

Figure 10A:
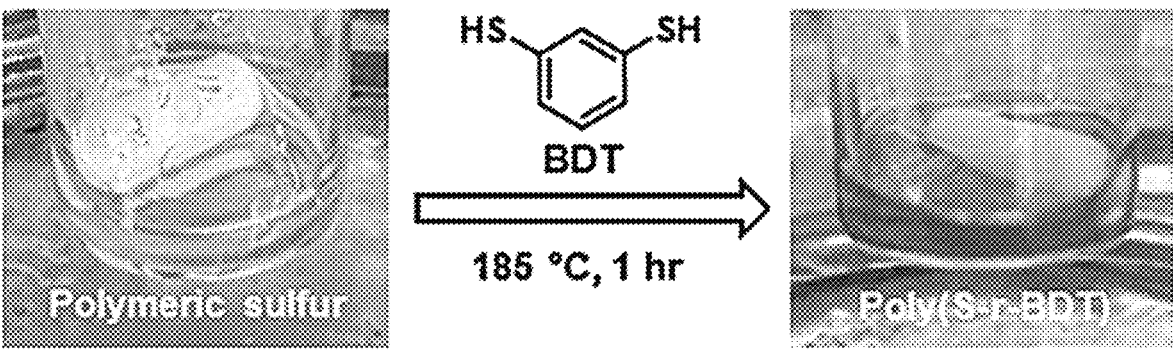
Figure 10B:
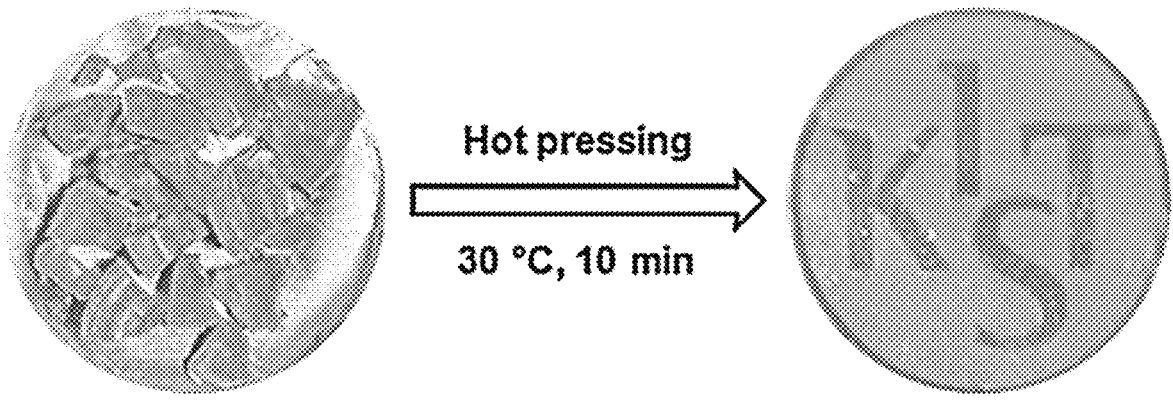

FIGS. 10A and 10B show a schematic diagram of a preparing process of a sulfur copolymer and a lens processing process using the sulfur copolymer according to an embodiment of the disclosure.

Figure 11:
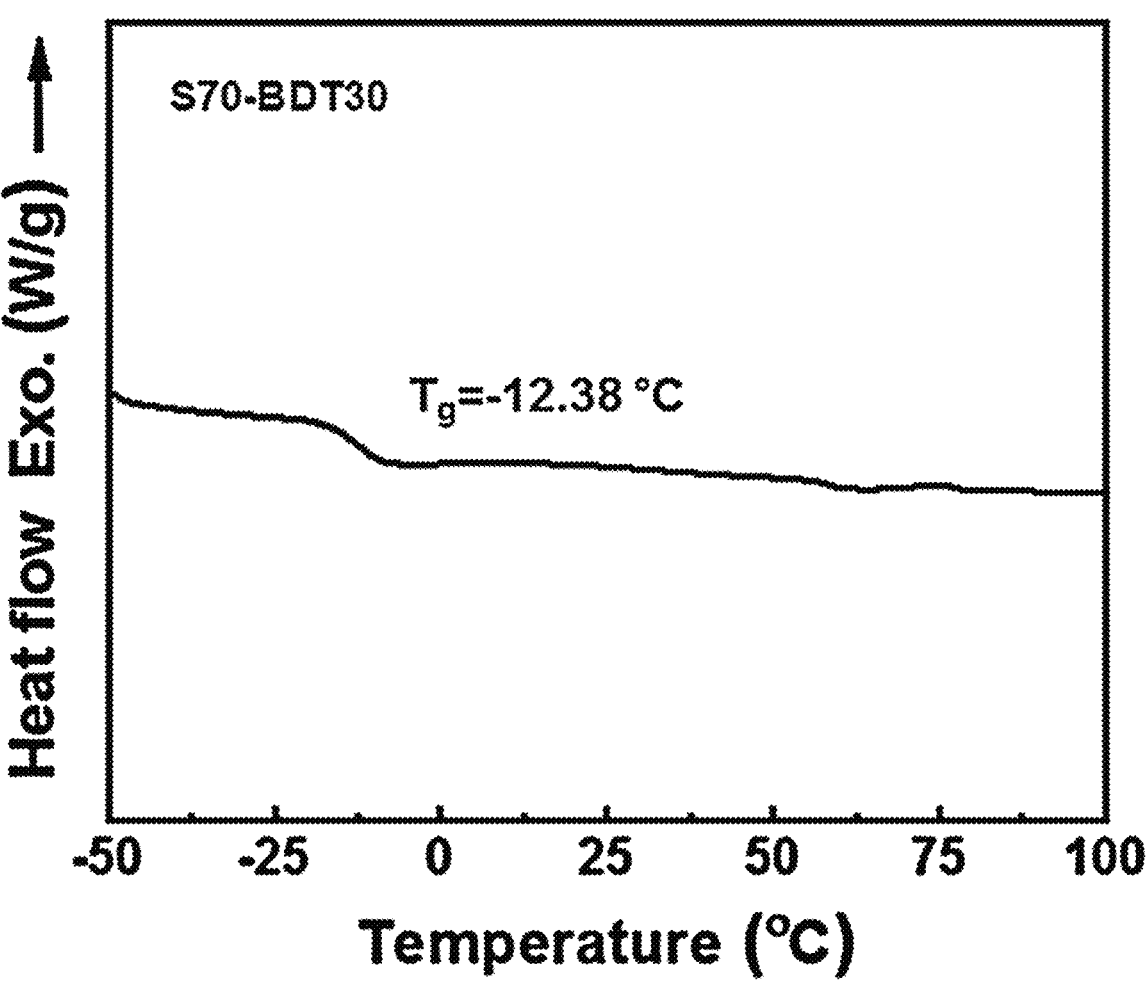

FIG. 11 shows the glass transition temperature of a sulfur copolymer according to an embodiment of the disclosure.

Figure 12:
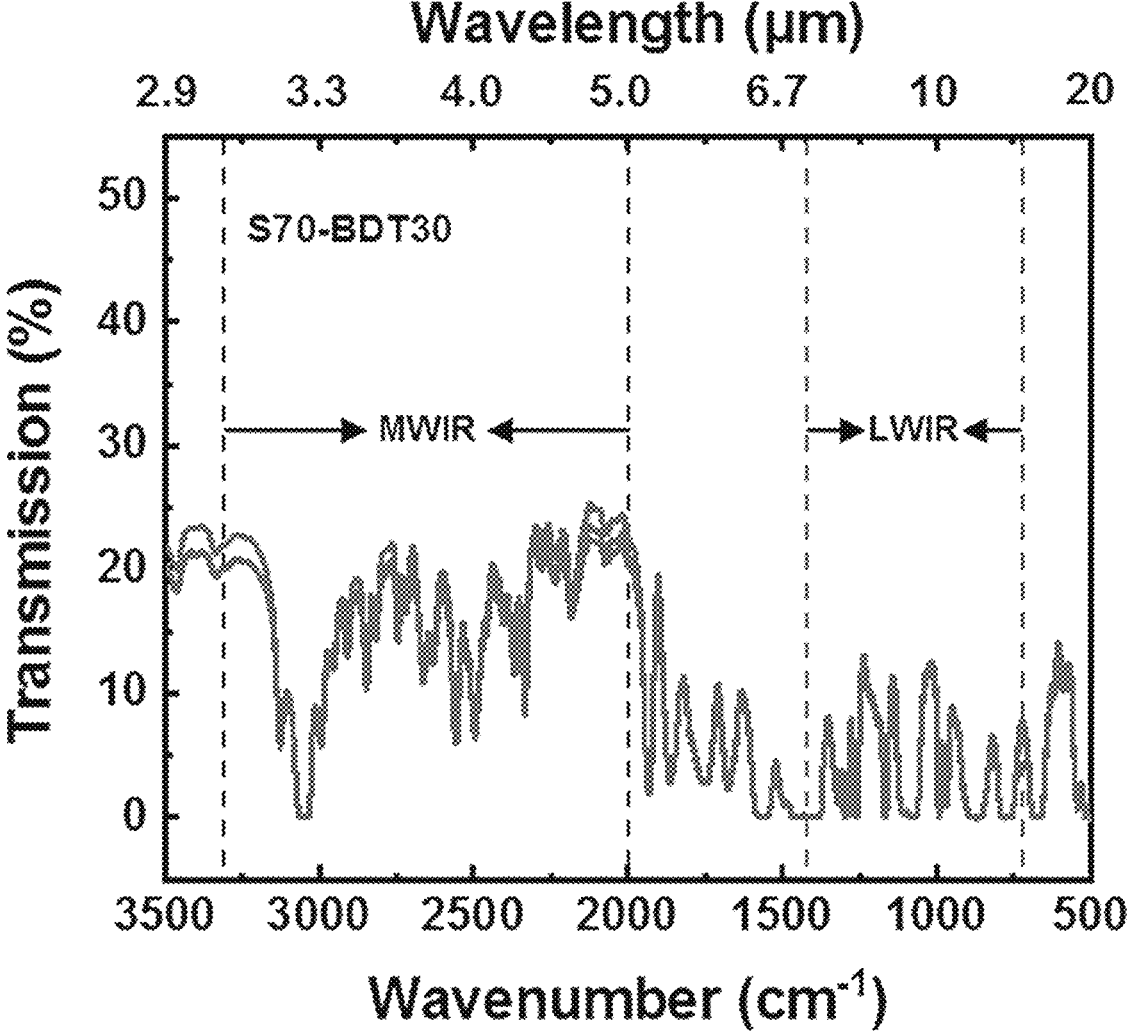

FIG. 12 shows the infrared transmittance of a sulfur copolymer according to an embodiment of the disclosure.

DETAILED DESCRIPTION OF THE INVENTION

Hereinafter, preferred embodiments of the disclosure will be described in detail with reference to the accompanying drawings.

The embodiments of the disclosure described herein are exemplified for the purpose of describing the disclosure only, and the embodiments of the disclosure may be carried out in various forms and should not be construed to be limited by the embodiment described herein.

Since the disclosure may have various changes and different forms, it should be understood that the embodiments are not intended to limit the disclosure to specific disclosure forms and they include all the changes, equivalents and replacements included in the spirit and technical scope of the disclosure.

The singular forms include the plural forms as well, unless the context dearly indicates otherwise. It should be understood that the terms "comprise," or "have", when used herein, specify the presence of stated features, integers, steps, operations, elements, components, and/or combinations thereof, but do not preclude the possibility of presence or addition of one or more other features, integers, steps, operations, elements, components, and/or combinations thereof.

Sulfur Copolymer

An exemplary embodiment according to the disclosure provides a sulfur copolymer including a repeating unit having a benzene and one or more sulfur monomers.

Another exemplary embodiment of the disclosure provides a sulfur copolymer including a repeating unit having a benzene and two or more sulfur monomers.

The sulfur monomer is a substituent of benzene, and the repeating unit of the sulfur copolymer may have a form in which 1 to 6 sulfur monomers are substituted for benzene.

Specifically, the sulfur copolymer is synthesized by a simple method, and can be widely used in cameras and lenses, or defense materials-related industries, by replacing expensive inorganic materials used in existing infrared lenses. In addition, by adjusting the content of one or more sulfur monomers or two or more sulfur monomers, not only mid-wave infrared transmission but also long-wave infrared transmittance can be maintained at a high level.

In an exemplary embodiment, the repeating unit may be represented by Chemical Formula 1 below.

[Chemical Formula 1]

In Chemical Formula 1, n is an integer from 0 to 100, m is an integer from 1 to 6.

The n is the repeating unit of S in the sulfur monomer, and m is the number of the sulfur monomers.

For example, the m may be 2, 3, or 6, and transmittance, refractive index, and heat resistance for use as an infrared lens may be adjusted by adjusting the number of sulfur monomers or the total sulfur content.

In an exemplary embodiment, the repeating unit may be represented by Chemical Formula 2 below.

[Chemical Formula 2]

In Chemical Formula 2, n1 to n3 are integers from 0 to 100, and are the same as or different from each other.

In an exemplary embodiment, the sulfur copolymer may be derived from an elemental sulfur and a thiol monomer. For example, the elemental sulfur can be denoted as elemental sulfur or $S_8$. For example, different refractive indices may be exhibited by controlling the type and content of the elemental sulfur and thiol monomer.

In an exemplary embodiment, the thiol monomer may be a dithiol monomer, a trithiol monomer, or a hexadiol monomer.

In an exemplary embodiment, the content of the elemental sulfur may be 50 to 80% by weight based on the total weight of the elemental sulfur and the thiol monomer. For example, the content of the elemental sulfur may be 50% by weight or more, 55% by weight or more, 60% by weight or more, 65% by weight or more, 70% by weight or more, 75% by weight or more, 80% by weight or less, 75% by weight or less, 70% by weight or less, 65% by weight or less, 60% by weight or less, or 55% by weight or less.

The higher the sulfur content, the higher the refractive index and infrared transmittance of the sulfur copolymer, but in the case that the content of the elemental sulfur exceeds 80% by weight and is excessively included, unreacted sulfur may exist in the copolymer. In addition, even if it is assumed that the elemental sulfur and the thiol monomer completely react without remaining unreacted sulfur, the copolymer may have rubber-like properties or reduced persistence of a shape at room temperature due to a low glass transition temperature ($T_g$). Accordingly, the applications thereof as optical materials may be limited.

In an exemplary embodiment, the content of the thiol monomer may be 20 to 50% by weight based on the total weight of the elemental sulfur and the thiol monomer. For example, the content of the thiol monomer may be 20% by weight or more, 25% by weight or more, 30% by weight or more, 35% by weight or more, 40% by weight or more, 45% by weight or more, 50% by weight or less, 45% by weight or less, 40% by weight or less, 35% by weight or less, 30% by weight or less, or 25% by weight or less.

In an exemplary embodiment, the weight ratio of the elemental sulfur and the thiol monomer may be 1:1 to 4:1. For example, the weight ratio may be 1:1 to 4:1, 1:1 to 3:1, or 1:1 to 2:1.

In an exemplary embodiment, the sulfur (S) content may be 70% by weight or more based on the total weight of the sulfur copolymer. This is based on the result of elemental analysis of the finally produced copolymer. For example, the sulfur content may be 70% by weight or more, 75% by weight or more, 80% by weight or more, 85% by weight or more, or 90% by weight or more.

In an embodiment of the disclosure, in the process of preparing a sulfur polymer, a hydrogen atom is removed as $H_2S$ gas from the —SH group of the thiol monomer, and the finally produced copolymer has a form in which the S—S chain is directly connected to a benzene ring.

In an exemplary embodiment, the sulfur copolymer may be for an infrared lens. The sulfur copolymer may be used as an optical material, for example, a sensor, camera, lens, or window.

In an exemplary embodiment, the sulfur copolymer may be for transmitting mid-wave infrared rays or long-wave infrared rays. In particular, as a material having high long-wave infrared transmittance as well as high mid-wave infrared transmittance, the sulfur copolymer can be used as an infrared lens by maintaining a high refractive index and a heat resistance even when long-wave infrared rays are transmitted.

In an exemplary embodiment, the sulfur copolymer may have a maximum transmittance of 70% when applied to an infrared lens having a thickness of 1 mm or more.

Here, the maximum transmittance refers to the transmittance of the peak point having the highest transmittance among numerous transmittance peaks appearing in an infrared spectrum. According to one embodiment of the disclosure, as the sulfur copolymer including the elemental sulfur and the trithiol monomer, in the case that the content of the elemental sulfur is 80% by weight, the highest peak in the infrared spectrum may show the transmittance of about 70%.

In an exemplary embodiment, when the sulfur copolymer is applied to an infrared lens having a thickness of 1 mm or more, the mid-wave infrared transmittance may be 50% or more.

Here, the mid-wave infrared transmittance refers to an average transmittance for each wavelength in the mid-wave infrared region. According to one embodiment of the disclosure, the sulfur copolymer including the elemental sulfur and the trithiol monomer may have the transmittance of the mid-wave infrared transmittance of 50% or more, or about 54.12% when the content of the elemental sulfur is 80% by weight.

In an exemplary embodiment, in the case that the sulfur copolymer is applied to an infrared lens having a thickness of 1 mm or more, the long-wave infrared transmittance may be 30% or more.

Here, the long-wave infrared transmittance refers to an average transmittance for each wavelength in the long-wave infrared region. According to one embodiment of the disclosure, the sulfur copolymer including the elemental sulfur and the trithiol monomer may have the long-wave infrared transmittance of 30% or more, or about 32.38% when the elemental sulfur content is 80% by weight.

An exemplary embodiment according to the disclosure provides an infrared lens including the sulfur copolymer described above.

Manufacturing Method of a Sulfur Copolymer

Another embodiment according to the disclosure provides a method for preparing a sulfur copolymer including the steps of providing an elemental sulfur; heating the elemental sulfur to produce a polymeric sulfur; and polymerizing the polymeric sulfur and a benzene monomer having one or more thiol groups to synthesize a sulfur copolymer.

Another exemplary embodiment of the disclosure provides a method for preparing a sulfur copolymer including the steps of providing an elemental sulfur; heating the elemental sulfur to produce a polymeric sulfur; and polymerizing the polymeric sulfur and a benzene monomer having two or more thiol groups to synthesize a sulfur copolymer.

The specific characteristics of the sulfur copolymer in this preparing method are the same as those described above and will not be described again.

First, the elemental sulfur is synthesized into molten sulfur, and the step of preparing the polymeric sulfur by heating the elemental sulfur in an exemplary embodiment may be performed at a temperature of 170 to 190° C. For example, the temperature may be 170° C. or higher, 175° C. or higher, 180° C. or higher, or 185° C. or higher, and may be 190° C. or lower, 185° C. or lower, 180° C. or lower, or 175° C. or lower. In this case, since no other special conditions are required other than the application of heat, the sulfur copolymer can be prepared by a simple method.

In an exemplary embodiment, a reverse vulcanization reaction may be performed in the step of synthesizing the sulfur copolymer. In this case, the sulfur copolymer with desired physical properties may be synthesized by changing the type of the benzene monomer such as a dithiol benzene, a trithiol benzene or a hexathiol benzene, or adjusting the weight % or weight ratio between the elemental sulfur and the thiol monomer as described above.

In an exemplary embodiment, the benzene monomer having one or more thiol groups or the benzene monomer having two or more thiol groups may be represented by Chemical Formula 3 below.

[Chemical Formula 3]

In an exemplary embodiment, after preparing the sulfur copolymer, a lens including the sulfur copolymer may be prepared through a hot pressing process, for example, a lens may be prepared at a temperature of 180 to 190° C., or 185° C., and at a pressure of 10 to 30 MPa, or 20 MPa.

EXAMPLES

The disclosure will be described in more detail through the following Examples. These Examples are only for exemplifying the disclosure, and it will be obvious to those skilled in the art that the scope of the disclosure is not interpreted to be limited by these Examples.

Example: Manufacturing of a Sulfur Copolymer

Figure 1:
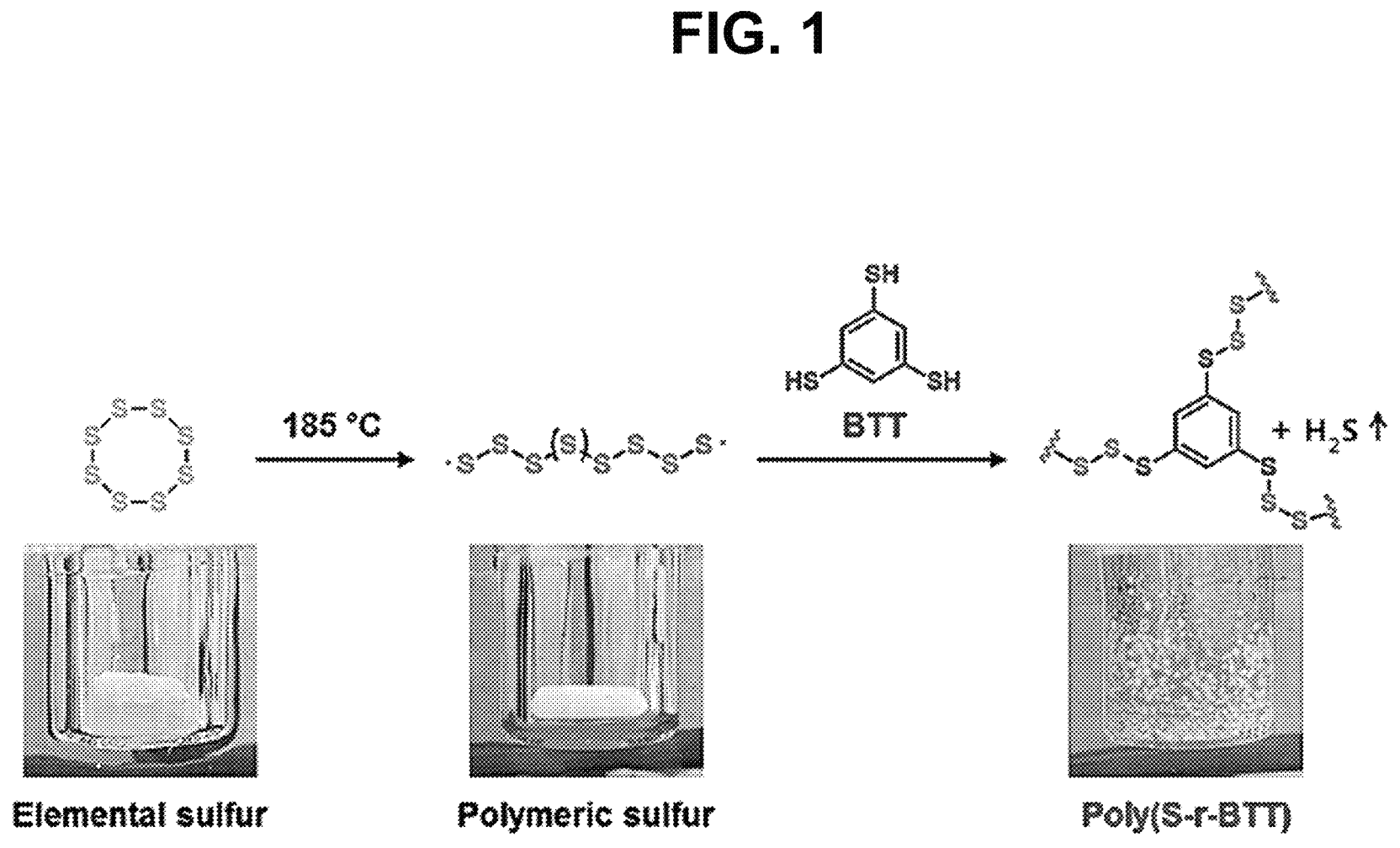

Referring to FIG. 1, the elemental sulfur added to a glass vial was heated in an oil bath at 185° C. for 3 minutes to prepare molten sulfur. In an in-situ reaction, a trithiol monomer (BTT, benzentrithiol) was added to molten sulfur and stirred for 1 hour to synthesize a reverse vulcanized sulfur random copolymer poly(S-r-BTT). In addition, the sulfur copolymer was prepared by varying the content of the elemental sulfur and the content of trithiol monomer as follows.

S80-BTT20 80% by weight of the elemental sulfur: 20% by weight of the trithiol monomer S70-BTT30 70% by weight of the elemental sulfur: 30% by weight of the trithiol monomer S60-BTT40 60% by weight of the elemental sulfur: 40% by weight of the trithiol monomer S50-BTT50 50% by weight of the elemental sulfur: 50% by weight of the trithiol monomer In addition, referring to FIGS. 10A-10B, the sulfur random copolymer poly(S-r-BDT) was synthesized in the same manner as described above, but using a dithiol monomer (BDT, benzenedithiol) with the following content.

S70-BDT30 70% by weight of the elemental sulfur: 30% by weight of the dithiol monomer Then, as shown in FIG. 2, the sulfur copolymer prepared using the trithiol monomer was hot-pressed at a temperature of 185° C. and a pressure of 20 MPa for 30 minutes to prepare a lens. A stainless steel mold with a width of 2.5 cm and a thickness of 1 mm was used to process the lens of a certain shape and thickness.

In addition, as shown in FIG. 2, since the dithiol monomer has a lower glass transition temperature than that of the trithiol monomer, the sulfur copolymer prepared using the dithiol monomer was pressed at a temperature of 30° C., at a pressure of 20 MPa for 10 minutes, which was a low temperature for a short time, to manufacture a lens. A stainless steel mold with a width of 2.5 cm and a thickness of 1 mm was used to process the lens of a certain shape and thickness.

Experimental Example 1: Image Characteristics by a Content of a Sulfur Copolymer FIG. 3 show digital images of sulfur copolymer lenses, S80-BTT20, S70-BTT30, S60-BTT40, and S50-BTT50 prepared as in FIG. 2. It was confirmed that the prepared sulfur copolymer lenses had a uniform shape with a width of about 2.5 cm and a thickness of about 1 mm. Despite being yellow, the lenses had high transparency, and the print located behind the lens could be clearly identified with the naked eye.

Experimental Example 2: Thermal Properties of a Sulfur Copolymer

As shown in FIG. 4, as a result of observing the weight loss and thermal stability of S80-BTT20, S70-BTT30, S60-

BTT40, and S50-BTT50 using thermogravimetric analysis (TGA, SETARAM, Setaram Instrumentation, Franc), different weight loss and thermal stability were observed depending on the weight ratio.

As shown in FIGS. 5A to 5B, by measuring differential scanning calorimetry (DSC, DSC 8000, PerkinElmer, U.S.A) and dynamic mechanical analysis (DMA, DMA Q800, Waters, U.S.A), the glass transition temperatures ($T_g$) of S80-BTT20, S70-BTT30, S60-BTT40, S50-BTT50 were measured.

As shown in Table 1 below, it can be confirmed that the synthesized sulfur copolymer has improved thermal properties as the thiol monomer content increases.

TABLE 1

| | $T_{d5\%}$ (° C.)[a] | $T_{d10\%}$ (° C.)[b] | $T_g$ (DSC) (° C.) | $T_g$ (DMA) (° C.) |
|---|---|---|---|---|
| S80-BTT20 | 205.21 | 237.80 | 14.85 | 40.83 |
| S70-BTT30 | 305.53 | 345.60 | 40.39 | 64.28 |
| S60-BTT40 | 306.94 | 352.21 | 66.21 | 96.31 |
| S50-BTT50 | 369.31 | 391.66 | 100.14 | 118.25 |

[a]Decomposition temperature, defined as 5 wt % loss,
[b]Decomposition temperature, defined as 10 wt % loss.

Experimental Example 3: Refractive Index of a Sulfur Copolymer

As shown in FIG. 6, as a result of measuring the refractive indices of S80-BTT20, S70-BTT30, S60-BTT40, and S50-BTT50 using a prism coupler (PC-2000, Metricon Corporation, U.S.A.), the synthesized sulfur copolymer had a different refractive index according to the contents of the elemental sulfur and thiol monomer content, and thus it can be confirmed that the refractive index increases as the content of the elemental sulfur increases.

As shown in Table 2 below, S80-BTT20 with the highest content of the elemental sulfur has a high refractive index of n~2.0 (637 nm) or more, which shows the highest refractive index among the reverse vulcanized polymers reported so far, except for terpolymers using selenium (Se), a high refractive organic metal.

TABLE 2

| Wavelength (nm) | S80-BTT20 | S70-BTT30 | S60-BTT40 | S50-BTT50 |
|---|---|---|---|---|
| 637 | 2.001 | 1.990 | 1.968 | 1.944 |
| 829 | 1.967 | 1.956 | 1.937 | 1.914 |
| 1306 | 1.943 | 1.932 | 1.913 | 1.890 |
| 1549 | 1.937 | 1.928 | 1.908 | 1.887 |

Experimental Example 4: Infrared Transmittance of a Sulfur Copolymer

As shown in FIG. 7, the infrared transmittances of the S80-BTT20, S70-BTT30, S60-BTT40, and S50-BTT50 lenses were measured using Spectrum 100 (PerkinElmer, U.S.A), and the lenses had different infrared transmittances depending on the contents of the elemental sulfur and thiol monomers of the synthesized sulfur copolymer, and it can be confirmed that the infrared transmittance increases as the content of the elemental sulfur increases.

Specifically, referring to the blue solid line in FIG. 7, it was confirmed that as the sulfur copolymer containing the elemental sulfur and the trithiol monomer, when the content of elemental sulfur was 80% by weight (S80-BTT20), the peak of the highest point in the infrared spectrum represented the transmittance of about 70%.

The infrared region where transmittance was measured was defined to 2.9 to 20 μm, 3500 to 500 cm$^{-1}$, the mid-wave infrared region where transmittance was measured was defined to 3 to 5 μm, 3300 to 2000 cm$^{-1}$, and the long-wave infrared region where transmittance was measured was defined to 7 to 14 μm, 1420 to 710 cm$^{-1}$. The lens used for infrared transmittance measurement had the same thickness of about 1 mm.

Table 3 below shows an average infrared transmittance of five measurements of the sulfur copolymer according to the contents of the elemental sulfur and thiol monomer. S80-BTT20, which has the highest content of the elemental sulfur, has the mid-wave infrared transmittance of 54.12% and the long-wave infrared transmittance of 32.38%. This is not only the highest infrared transmittance among inverse vulcanization polymers reported so far, but also comparable to germanium (Ge) lenses, which are representative infrared optical materials. In addition, compared to the comparative polymer PMMA and the existing sulfur-containing polymer, the long-wave infrared transmittance is at a very high level.

TABLE 3

| | Thickness (mm) | Transmission (%)[a] MWIR[b] | LWIR[c] |
|---|---|---|---|
| Ge | 1.087 | 46.19 | 42.35 |
| PMMA | 1.153 | 2.53 | 0.09 |
| S70-DIB30 | 1.281 | 21.16 | 0.08 |
| S70-DVB30 | 1.276 | 23.77 | 0.24 |
| S80-BTT20 | 1.156 | 54.12 | 32.38 |
| S70-BTT30 | 1.139 | 47.44 | 26.72 |
| S60-BTT40 | 1.144 | 41.47 | 20.21 |
| S50-BTT50 | 1.156 | 33.59 | 13.93 |

[a]Average of 5 measurements,
[b]Mid-wave infrared (MWIR) spectrum (3-5 μm, 3300-2000 cm$^{-1}$),
[c]Long-wave infrared (LWIR) spectrum (7-14 μm, 1420-710 cm$^{-1}$).

Experimental Example 5: Mid-Wave Infrared Image Characteristics of a Sulfur Copolymer As shown in FIGS. 8A to 8D, the mid-wave infrared images of S80-BTT20, S70-BTT30, S60-BTT40, and S50-BTT50 were measured using a Themos mini (C-10614-02) thermal emission microscope (Hamamatsu Photonics, Japan). A USAF 1951 target (Edmund Optics) located behind the lens was clearly imaged in all lenses. It was confirmed that the lenses prepared in the examples not only exhibited high mid-wave infrared transmittance measurement values, but also could show actual mid-wave infrared imaging.

The lens used for mid-wave infrared imaging had the same thickness of about 1 mm, and the wavelength band of the mid-wave infrared camera used for imaging was 3 to 5 μm. It can be confirmed that the mid-wave infrared imaging is possible without significant degradation in resolution even when the content of thiol monomer is increased. The specific conditions are as follows.

(8A) is a schematic diagram of mid-wave infrared (MWIR) imaging setup (3 to 5 μm, 3300 to 2000 cm$^{-1}$), (8B) shows MWIR transmittance (%) of polymer lenses (thickness of about 1 mm), (8C) shows the digital images of polymer lenses (thickness of about 1 mm); PMMA, S70-DIB30, S70-DVB30, S80-BTT20, S70-BTT30, S60-BTT40 and S50-BTT50 (from left to right) and (8D) shows MWIR region images (3 to 5 μm, 3300 to 2000 cm$^{-1}$) of the USAF 1951 target through various polymer lenses (thickness of about 1 mm); PMMA, S70-DIB30, S70-DVB30, S80-BTT20, S70-BTT30, S60-BTT40 and S50-BTT50 (from left to right).

Experimental Example 6: Long-wave Infrared Image Characteristics of a Sulfur Copolymer As shown in FIGS. 9A to 9J, the long-wave infrared images of S80-BTT20, S70-BTT30, S60-BTT40, and S50-BTT50 were measured using a FLIR T335 (Teledyne FLIR, U.S.A.). The pattern-cut PMMA mask was placed in front of a hot plate of 160° C., and the lens with the sulfur copolymer was placed in front of it. The PMMA mask pattern located behind the lens was clearly imaged in all lenses. It was confirmed that the lens prepared in the Example not only exhibited a high long-wave infrared transmittance measurement value, but also showed actual long-wave infrared imaging.

The germanium lens and the sulfur copolymer lens used for the long-wave infrared imaging had the same thickness of about 1 mm, and the wavelength band of the long-wave infrared camera used for imaging was 7.5 to 13 μm. It can be confirmed that the long-wave infrared image can be shown without significant deterioration of resolution even when the content of thiol monomer is increased. The specific conditions are as follows.

(9A) is a schematic diagram of long-wave infrared (LWIR) imaging setup (7 to 14 μm, 1420 to 710 cm$^{-1}$), (9B) shows the long-wave infrared transmittances (%) of the polymer lenses (thickness of 1 mm) and (9C) to (9J) show the long-wave infrared region image (7 to 14 μm, 1420 to 710 cm$^{-1}$) of patterned PMMA mask through Ge lens and various polymer lenses (thickness of about 1 mm); (9C) PMMA, (9D) Ge lens, (9E) 570-DIB30, (9F) S70-DVB30, (9G) S80-BTT20, (9H) S70-BTT30, (9I) S60-BTT40 and (9J) S50 -BTT50.

Experimental Example 7: Thermal Properties of a Sulfur Copolymer

As shown in FIG. 11, the glass transition temperature ($T_g$) of S70-BDT30 was measured by measuring differential scanning calorimetry (DSC, DSC 8000, PerkinElmer, U.S.A) and dynamic mechanical analysis (DMA, DMA Q800, Waters, U.S.A). The glass transition temperature was measured to be −12.38° C., and unreacted sulfur was not confirmed on the DSC of the synthesized sulfur copolymer (S70-BDT30).

Experimental Example 8: Infrared Transmittance of a Sulfur Copolymer

As shown in FIG. 12, the infrared transmittance of S70-BDT30 was measured using Nicolet iS10 (Thermo Fisher Scientific, U. S.A), and it was confirmed that the average mid-wave infrared transmittance was 16.23% and the average long-wave infrared transmittance was 4.13%, which were improved compared to previous studies.

The infrared region where transmittance was measured was defined to 2.9 to 20 μm, 3500 to 500 cm$^{-1}$, the mid-wave infrared region where transmittance was measured was defined to 3 to 5 μm, 3300 to 2000 cm$^{-1}$, and the long-wave infrared region where transmittance was measured was defined to 7 to 14 μm, 1420 to 710 cm$^{-1}$. The example lens in which the infrared transmittance was measured has the same thickness of about 1 mm.

Experimental Example 9: Optical Characteristics of a Sulfur Copolymer

As shown in Table 4 below, the optical characteristics of S70-BDT30 were measured using a prism coupler (PC-2000, Metricon Corporation, U.S.A.), and a high refractive index of n>1.9 (TE, 637 nm) was confirmed.

TABLE 4

| | Thickness | | Transmission (%) | |
|---|---|---|---|---|
| | (mm) | Refractive index $(n_{TE})^a$ | MWIR$^b$ | LWIR$^c$ |
| S70-BDT30 | 1.187 | 1.92911 | 16.12 | 4.30 |
| | | | 15.64 | 4.00 |
| | | | 16.94 | 4.10 |
| | | | 16.23$^d$ | 4.13$^e$ |

$^a$Measured at 637 nm,
$^b$Mid-wave infrared (MWIR) spectrum (3-5 μm, 3300-2000 cm$^{-1}$),
$^c$Long-wave infrared (LWIR) spectrum (7-14 μm, 1420-710 cm$^{-1}$),
$^{d\&e}$Average of 3 point measurements.

Experimental Example 10: Component Analysis of a Sulfur Copolymer

After final production of the reverse vulcanized sulfur random copolymer poly(S-r-BTT) prepared in Example, the element content was analyzed using an IT/Flash 2000 apparatus from Thermo Fisher Scientific, and is shown in Table 5 below. As a result of observation, it was confirmed that the excellent optical characteristics of the sulfur copolymers according to the examples of the disclosure were due to the high sulfur content.

In addition, as shown in Table 5 below, sulfur copolymers were prepared using vinyl-based monomers, 1,3-diisopropenylbenzene (DIB) and divinylbenzene (DVB) with a sulfur content of 70% by weight as a comparative example. Similar to the thiol monomer, it was synthesized by stirring for 1 hour in an in-situ reaction with molten sulfur. Each reaction temperature was carried out at 185° C. and 160° C.

S70-DIB30 70% by weight of the elemental sulfur: 30% by weight of DIB

S70-DVB30 70% by weight of the elemental sulfur: 30% by weight of DVB

As a result of the elemental analysis using the same apparatus as the sulfur random copolymer poly(S-r-BTT) component analysis, it was confirmed that the sulfur contents of S70-DIB30 and S70-DVB30 were about 73% and 74%, respectively, which was lower than that of the sulfur copolymer prepared from the thiol monomer according to an embodiment of the disclosure.

TABLE 5

| | Content(wt %) | | Carbon | Hydrogen | Nitrogen | Sulfur | |
| --- | --- | --- | --- | --- | --- | --- | --- |
| | Sulfur | Comonomer | (C)% | (H)% | (N)% | (S)% | % |
| S70-DIB30 | 70 | 30 | 26.072 | 2.228 | 0.015 | 73.299 | 101.614 |
| S70-DVB30 | 70 | 30 | 24.754 | 1.881 | 0.006 | 74.018 | 100.659 |
| S80-BTT20 | 80 | 20 | 9.500 | 0.321 | 0.015 | 92.473 | 102.309 |
| S70-BTT30 | 70 | 30 | 14.009 | 0.483 | 0.015 | 87.682 | 102.189 |
| S60-BTT40 | 60 | 40 | 19.118 | 0.683 | 0.000 | 82.337 | 102.138 |
| S50-BTT50 | 50 | 50 | 24.339 | 0.896 | 0.000 | 75.120 | 100.355 |

The examples of the disclosure described above should not be interpreted to limit the technical spirit of the disclosure. The scope of the disclosure to be protected is limited only by the matters described in the claims, and those skilled in the art of the disclosure can improve and change the technical spirit of the disclosure in various forms. Therefore, such improvements and changes would fall within the scope of the disclosure to be protected as long as they are obvious to those skilled in the art.

What is claimed is:

1. A sulfur copolymer comprising a repeating unit comprising benzene and one or more sulfur monomers, wherein the repeating unit is represented by Chemical Formula 2:

[Chemical Formula 2]

$$*-(S)_{n1}-S-\text{(benzene)}-S-(S)_{n2}-*$$
$$S-(S)_{n3}-*$$

wherein n1 to n3 are integers from 0 to 100, and are the same as or different from each other.

2. The sulfur copolymer of claim 1, wherein the sulfur copolymer is derived from an elemental sulfur and a thiol monomer, and the thiol monomer is, a trithiol monomer.

3. The sulfur copolymer of claim 1, wherein the sulfur copolymer is derived from an elemental sulfur and a thiol monomer, and a content of the elemental sulfur is 50 to 80% by weight based on a total weight of the elemental sulfur and the thiol monomer.

4. The sulfur copolymer of claim 1, wherein the sulfur copolymer is derived from an elemental sulfur and a thiol monomer, and a content of the thiol monomer is 20 to 50% by weight based on a total weight of the elemental sulfur and the thiol monomer.

5. The sulfur copolymer of claim 1, wherein the sulfur copolymer is derived from an elemental sulfur and a thiol monomer, and a weight ratio of the elemental sulfur and the thiol monomer is 1:1 to 4:1.

6. The sulfur copolymer of claim 1, wherein the sulfur copolymer is for an infrared lens.

7. The sulfur copolymer of claim 1, wherein the sulfur copolymer is for transmitting a mid-wave infrared ray or a long-wave infrared ray.

8. The sulfur copolymer of claim 1, wherein the sulfur copolymer has a maximum transmittance of 70% when applied to an infrared lens having a thickness of 1 mm or more.

9. The sulfur copolymer of claim 1, wherein the sulfur copolymer has a mid-wave infrared transmittance of 50% or more when applied to an infrared lens having a thickness of 1 mm or more.

10. The sulfur copolymer of claim 1, wherein the sulfur copolymer has a long-wave infrared transmittance of 30% or more when applied to an infrared lens having a thickness of 1 mm or more.

11. An infrared lens comprising the sulfur copolymer of claim 1.

12. A method for preparing a sulfur copolymer of claim 1, comprising the steps of:

providing an elemental sulfur;

heating the elemental sulfur to prepare a polymeric sulfur; and polymerizing the polymeric sulfur and a benzene monomer having one or more thiol groups to synthesize a sulfur copolymer, wherein the benzene monomer having the one or more thiol groups is represented by the following Chemical Formula 3

[Chemical Formula 3: benzene ring with HS, SH, SH substituents]

13. The method of claim 12, wherein in the step of synthesizing the sulfur copolymer, a reverse vulcanization reaction is performed.

14. The method of claim 12, wherein the step of heating the elemental sulfur to prepare the polymeric sulfur is performed at a temperature of 170 to 190° C.

* * * * *